United States Patent
Lei et al.

(10) Patent No.: US 11,101,936 B2
(45) Date of Patent: Aug. 24, 2021

(54) METHOD AND APPARATUS OF USING REDUNDANT BITS IN SEMI-STATICALLY CONFIGURED HARQ-ACK CODEBOOK

(71) Applicant: Lenovo (Beijing) Limited, Beijing (CN)

(72) Inventors: Haipeng Lei, Beijing (CN); Chenxi Zhu, Beijing (CN); Zhi Yan, Beijing (CN); Zhennian Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 8 days.

(21) Appl. No.: 16/638,438

(22) PCT Filed: Aug. 11, 2017

(86) PCT No.: PCT/CN2017/097195
§ 371 (c)(1),
(2) Date: Feb. 11, 2020

(87) PCT Pub. No.: WO2019/028875
PCT Pub. Date: Feb. 14, 2019

(65) Prior Publication Data
US 2020/0169357 A1  May 28, 2020

(51) Int. Cl.
*H04L 1/18* (2006.01)
*H04B 7/06* (2006.01)
*H04L 1/00* (2006.01)

(52) U.S. Cl.
CPC ......... *H04L 1/1812* (2013.01); *H04B 7/0632* (2013.01); *H04B 7/0639* (2013.01); *H04L 1/0003* (2013.01); *H04L 1/0008* (2013.01)

(58) Field of Classification Search
CPC ... H04L 1/1812; H04L 1/0003; H04L 1/0008; H04L 1/0031; H04L 1/0029;
(Continued)

(56) References Cited

U.S. PATENT DOCUMENTS

2015/0131494 A1*  5/2015  He ............... H04W 72/046
                                              370/280
2017/0142593 A1  5/2017  Hanbyul Deo et al.
(Continued)

FOREIGN PATENT DOCUMENTS

WO  2018204491 A1  11/2018

OTHER PUBLICATIONS

3GPP, 3rd Generation Partnership Project; Technical Specification Group Radio Access Network; Overview of CBG-based retransmission in NR 3GPP R1-1705401, Apr. 2017, pp. 1-4.
(Continued)

*Primary Examiner* — Fifth Y Hailegiorgis
(74) *Attorney, Agent, or Firm* — Kunzler, Bean & Adamson (57) ABSTRACT

The present application is related to a method and apparatus of using redundant bits in semi-statically configured HARQ-ACK feedback. A method of receiving information according to one embodiment comprises receiving a first number of code block groups from a base unit, wherein each code block within a code block group is independently decodable; determining a (HARQ-ACK) codebook size corresponding to the first number of code block groups; and transmitting a HARQ-ACK codebook to the base unit, wherein the HARQ-ACK codebook comprises the first number of HARQ-ACK bits with each bit corresponding to one code block group and a second number of padded bits. The first number plus the second number is equal to the determined HARQ-ACK codebook size. The present application enhances the downlink (DL) transmission performance and the uplink (UL) HARQ-ACK transmission reliability.

20 Claims, 5 Drawing Sheets

(58) Field of Classification Search
CPC ... H04L 1/0025; H04L 1/0061; H04L 1/1896; H04L 1/1861; H04L 1/0073; H04B 7/0632; H04B 7/0639
USPC .......................................... 375/260; 370/329
See application file for complete search history.

(56) References Cited

U.S. PATENT DOCUMENTS

2017/0207895 A1    7/2017  Yang et al.
2018/0206223 A1*   7/2018  Kim .................... H04W 72/044

OTHER PUBLICATIONS

3GPP, 3rd Generation Partnership Project; Technical Specification Group Radio Access Network; CBG-based (re) transmission, pre-emption indication and subsequent transmission in NR, 3GPP R1-1708484, May 2017, pp. 1-8.
Lenovo_R1-1710604, "UL HARQ-ACK feedback for CBG-based retransmission", 3GPP TSG RAN WGI NR Ad-Hoc#2, Jun. 30, 207, p. 1-5.

* cited by examiner

METHOD AND APPARATUS OF USING REDUNDANT BITS IN SEMI-STATICALLY CONFIGURED HARQ-ACK CODEBOOK

TECHNICAL FIELD

The present application generally relates to hybrid automatic repeat request-acknowledge (HARQ-ACK) feedback, and more specifically to semi-statically configured HARQ-ACK codebook.

BACKGROUND OF THE INVENTION

In wireless communication technology, HARQ-ACK feedback technology is commonly used during data transmission, so as to feedback whether data was correctly received in the downlink (DL) or uplink (UL) transmission. HARQ-ACK represents collectively the Positive Acknowledgement (ACK) and the Negative Acknowledgement (NACK). ACK means data was correctly received while NACK means data was erroneously received. For HARQ-ACK feedback information (which may be called as a HARQ-ACK codebook, for example), the HARQ-ACK codebook size is usually preconfigured and/or determined during transmission. However, in some cases, not all of the HARQ-ACK bits in the HARQ-ACK book are actually useful for HARQ-ACK feedback for a data transmission, other useless bits may be called redundant bits. On the basis of the shortage of wireless network resources, redundant bits in HARQ-ACK feedback information thus render low efficiency of data transmission in the wireless communication.

A manner of fully using redundant bits in the HARQ-ACK feedback information is desirable.

BRIEF SUMMARY OF THE INVENTION

One objective of the present application is to provide a manner of fully using redundant bits in the HARQ-ACK feedback information.

One embodiment of the present application provides a method. The method includes receiving a first number of code block groups from a base unit, wherein each code block within a code block group is independently decodable; a hybrid automatic repeat request acknowledgement (HARQ-ACK) codebook size corresponding to the first number of code block groups is determined; a HARQ-ACK codebook is transmitted to the base unit/wherein the HARQ-ACK codebook includes the first number of HARQ-ACK bits with each bit corresponding to one code block group and a second number of padded bits, wherein the first number plus the second number is equal to the determined HARQ-ACK codebook size.

Another embodiment of the present application also provides an apparatus. The apparatus includes a receiver that receives a first number of code block groups from a base unit, wherein each code block within a code block group is independently decodable; a processor that determines a hybrid automatic repeat request acknowledgement (HARQ-ACK) codebook size corresponds to the first number of code block groups; and a transmitter that transmits a HARQ-ACK codebook to the base unit, wherein the HARQ-ACK codebook includes the first number of HARQ-ACK bits with each bit corresponding to one code block group and a second number of padded bits, wherein the first number plus the second number is equal to the determined HARQ-ACK codebook size.

Yet another embodiment of the present application also provides a method. The method includes transmitting a first number of code block groups to a remote unit, wherein each code block within a code block group is independently decodable; a hybrid automatic repeat request acknowledgement (HARQ-ACK) codebook size corresponding to the first number of code block groups is determined; and a HARQ-ACK codebook is received from the remote unit, wherein the HARQ-ACK codebook includes the first number of HARQ-ACK bits with each bit corresponding to one code block group and a second number of padded bits, wherein the first number plus the second number is equal to the determined HARQ-ACK codebook size.

A further embodiment of the present application also provides an apparatus. The apparatus includes a transmitter that transmits a first number of code block groups to a remote unit, wherein each code block within a code block group is independently decodable; a processor that determines a hybrid automatic repeat request acknowledgement (HARQ-ACK) codebook size corresponds to the first number of code block groups; a receiver that receives a HARQ-ACK codebook from the remote unit, wherein the HARQ-ACK codebook includes the first number of HARQ-ACK bits with each bit corresponding to one code block group and a second number of padded bits, wherein the first number plus the second number is equal to the determined HARQ-ACK codebook size.

Embodiments according to the present application can enhance the performance of downlink (DL) transmission and the reliability of uplink (UL) HARQ-ACK transmission.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only example embodiments of the present application and are not therefore to be considered as limiting of its scope.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide the method and apparatus for using redundant bits in semi-statically configured HARQ-ACK feedback information. To facilitate understanding, embodiments are provided under specific network architecture and new service scenarios, such as 3GPP 5G, 3GPP LIE Release 8 and onwards. Persons skilled in the art know well that, with development S of network architecture and new service scenarios, the embodiments in the subject disclosure are also applicable to similar technical problems.

Figure 1:
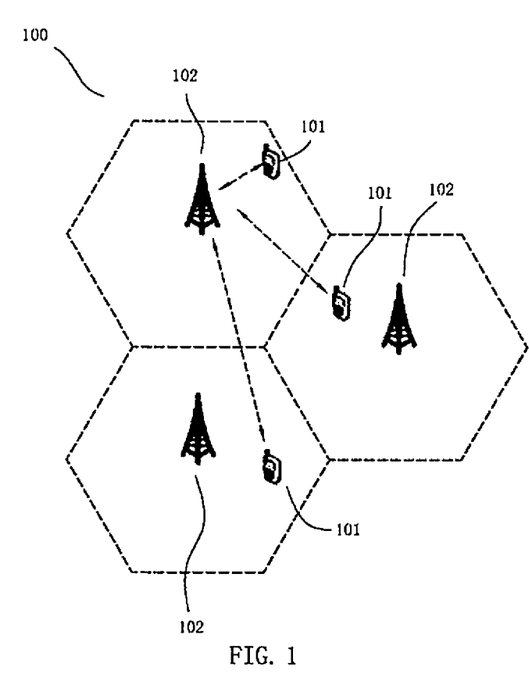
FIG. 1 illustrates an example block diagram of a wireless communication system according to an embodiment of the present application.

FIG. 1 depicts a wireless communication system 100 according to an embodiment of the present application.

As shown in FIG. 1, the wireless communication system 100 includes remote units 101 and base units 102. Even though a specific number of remote units 101 and base units 102 are depicted in FIG. 1, one of skill in the art will recognize that any number of remote units 101 and base units 102 may be included in the wireless communication system 100.

The remote units 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present application, the remote units 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the remote units 101 include wearable devices, such as smart watches, fitness bands, optical head-mounted displays, or the like. Moreover, the remote units 101 may be referred to as subscriber units, mobiles, mobile stations, users, terminals, mobile terminals, wireless terminals, fixed terminals, subscriber stations, UE, user terminals, a device, or by other terminology used in the art. The remote units 101 may communicate directly with a base unit 102 via uplink (UL) communication signals.

The base units 102 may be distributed over a geographic region. In certain embodiments, a base unit 102 may also be referred to as an access point, an access terminal, a base, a base station, a macro cell, a Node-B, an enhanced Node B (eNB), a gNB, a Home Node-B, a relay node, a device, or by any other terminology used in the art. The base units 102 are generally part of a radio access network that may include one or more controllers communicably coupled to one or more corresponding base units 102.

The base units 102 are generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base units 102 may be communicably coupled to a mobility management entity (MME), a serving gateway (SGW), and/or a packet data network gateway (PGW).

The base units 102 may serve a number of remote units 101 within a serving area, for example, a cell or a cell sector via a wireless communication link. The base units 102 may communicate directly with one or more of the remote units 101 via communication signals. For example, a base unit 102 may serve remote units 101 within a macro cell.

The base units 102 transmits downlink (DL) communication signals to serve the remote units 101 in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the remote units 101 and the base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system 100 is compliant with the long-term evolution (LTE) of the 3GPP protocol, wherein the base unit 102 transmits using an orthogonal frequency division multiplexing (OFDM) modulation scheme on the DL and the remote units 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the base unit 102 may communicate using other communication protocols, such as the IEEE 802.11 family of wireless communication protocols. Further, in some embodiments the base unit 102 may communicate over licensed spectrum, while in other embodiments the base unit 102 may communicate over unlicensed spectrum. The present disclosure is not intended to be limited to the implementation of any particular wireless communication system architecture or protocol. In another embodiment, the base unit 102 may communicate with remote units 101 using the 3GPP 5G protocols.

According to an embodiment of the present application, downlink (DL) transport blocks (TBs) are carried on the Physical Downlink Shared Channel (PDSCH). A maximum of two TBs can be transmitted in one PDSCH in one serving cell and in one sub-frame. One TB includes a plurality of code blocks, several code blocks in a TB are grouped into one code block group (C3G), and each code block within a code block group is independently decodable. That is, a TB includes a plurality of CBGs. The number of code blocks of one CBG, i.e., CBG size, varies according to the TB size. Based on the number of CBGs, a wireless communication device, for example, a UE, can generate a single bit for each CBG then concatenate the generated bits in one HARQ-ACK codebook. That is, one HARQ-ACK bit corresponds to one CBG, and the number of resulting HARQ-ACK bits for one TB may be equal to the number of code block groups. That will balance the number of the needed HARQ-ACK feedback bits and the retransmission efficiency.

The number of code groups of one TB can be configured via Radio Resource Control (RRC) signaling.

When all the code blocks within one CBG are correctly decoded, the HARQ-ACK for the CBG is set to "ACK." Otherwise, it is set to "NACK." Upon the reception of the HARQ-ACK feedback, the CBG(s) with "NACK" shall be retransmitted by the transmitter. Meanwhile, the wireless receiving device, for example, a UE, will combine the received retransmitted CBG(s) with the previously incorrectly decoded CBG(s) for further decoding. Hence, the wireless transmitting device (for example, a BS) and the wireless receiving device could have the same understanding on CBG construction, CBG indication, number of HARQ-ACK feedback bits as well as the mapping relationship between one HARQ-ACK bit and one CBG. The wireless transmitting device and the wireless receiving device may synchronize the knowledge on the HARQ-ACK codebook in each transmission or retransmission to avoid any misunderstanding.

According an embodiment of the present application, a manner of determining the HARQ-ACK codebook size for retransmitted CBG(s), HARQ-ACK codebook size is equal to the RRC configured number of CBGs for one TB. Then the HARQ-ACK codebook ze is semi-statically configured and not variable between retransmission and initial transmission.

Figure 2:
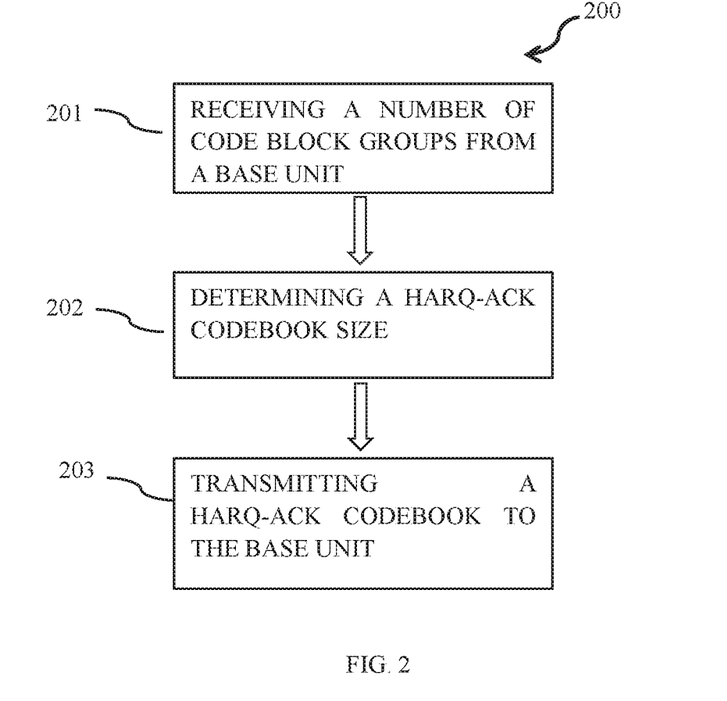
FIG. 2 illustrates an example flowchart demonstrating the operations of a remote unit according to an embodiment of the present application.

FIG. 2 depicts a method 200 according to an embodiment of the present application. In some embodiments, the method 200 is performed by an apparatus, such as the remote units 101. In certain embodiments, the method 200 may be performed by a processor executing program code, for example, a microcontroller, a microprocessor, a CPU, a GPU, an auxiliary processing unit, a FPGA, or the like.

In step 201, a number of CBGs is received from a base unit. In step 202, a HARQ-ACK codebook size is determined. For example, a HARQ-ACK codebook size corresponding to the number of received CBGs is determined. In step 203, a HARQ-ACK codebook having the determined HARQ-ACK codebook size is transmitted to the base unit. In one embodiment, a first portion of the HARQ-ACK codebook includes a number of HARQ-ACK bits with each bit corresponding to one CBG, and a second portion of the HARQ-ACK codebook includes a number of padded bits. The sum of the number of HARQ-ACK bits in the first portion and the number of padded bits in the second portion is equal to the determined HARQ-ACK codebook size.

In one embodiment, the HARQ-ACK codebook size is determined based on a preconfigured value. The preconfigured value may be indicated by a signal received from a base unit, indicated by a control signaling received before the data transmission, or indicated by a control signaling received during the data transmission.

For example, the number of HARQ-ACK bits in the first portion, e.g., M, is equal to the number of CBGs actually received by a remote unit in initial transmission or retransmitted CBGs in retransmission between a base unit and the remote unit. Assuming N is the RRC configured maximum number of CBGs of one TB, so (N−M) is the number of padded bits in the second portion of the HARQ-ACK codebook corresponding to the initial transmission or retransmission.

For an additional example, the RRC configured number of CBGs for one TB is four, the HARQ-ACK codebook size is determined as four, and there are four CBGs transmitted in initial transmission. That is, N=4. However, when two CBGs are not correctly received or not successfully decoded in initial transmission, these two CBGs need to be retransmitted and the number of retransmitted CBGs is two. Accordingly, for semi-static HARQ-ACK codebook size determination, two HARQ-ACK bits in a HARQ-ACK codebook for the initial transmission are set to NACK, and the other two HARQ-ACK bits in the HARQ-ACK codebook for the initial transmission are set to ACK. Under this situation, M=4 and (N−M)=0. There is no redundant bit in the HARQ-ACK codebook. Then, after retransmitting two CBGs which are not correctly received or not successfully decoded in initial transmission, the number of retransmitted CBGs may be two, one, or zero. In other words, when both the retransmitted two CBGs are not correctly received or successfully decoded, the erroneous CBG(s) needs to be retransmitted again. For instance, when one CBG needs to be retransmitted again, one HARQ-ACK bit in a HARQ-ACK codebook for the retransmission is set to HACK, one HARQ-ACK bit in the HARQ-ACK codebook for the retransmission is set to ACK. Under this situation, for semi-static HARQ-ACK codebook size determination, M=2, (N−M)=2, the HARQ-ACK codebook includes two redundant bits, and these two redundant bits need to be padded to guarantee the number of HARQ-ACK codebook size, i.e., N=4.

For another example, the RRC configured number of CBGs for one TB is four, the HARQ-ACK codebook size is determined as four, i.e., N=4. In a certain embodiment, when the number of CBs in one TB is smaller than the RRC configured number of CBGs of one TB, e.g., when there are three CBs for a given TB, then there are three CBGs with each CBG including one CB in initial transmission. For semi-static HARQ-ACK codebook size determination, one redundant bit in the HARQ-ACK codebook for the initial transmission needs to be padded in addition to the three ACK/NACK bits, so as to guarantee the number of HARQ-ACK bits in the codebook to equal to the RRC configured number of CBGs of one TB, i.e., N=4. For instance, when one CBG is not successfully decoded in initial transmission, one HARQ-ACK bit in a HARQ-ACK codebook for the initial transmission is set to NACK, two HARQ-ACK bits in the HARQ-ACK codebook for the initial transmission are set to ACK, while the other one redundant bit needs to be padded, i.e., M=3 and (N−M)=1. Then, after retransmitting the CBG which was not successfully decoded in initial transmission, the number of retransmitted CBG may be 1 or 0. In other words, when the retransmitted CBG was not correctly received or successfully decoded during this retransmission again, the erroneous CBG needs to be retransmitted for the second time. Accordingly, one HARQ-ACK bit in a HARQ-ACK codebook for the retransmission is set to NACK, i.e., M=1, and (N−M)=3. Thus, the HARQ-ACK codebook includes three redundant bits and these three redundant bits need to be padded to guarantee the number of HARQ-ACK codebook size, N=4.

Embodiments can provide multiple examples of making full use of the redundant bits for semi-static CBG-based HARQ-ACK codebook size so as to enhance the DL transmission performance and UL HARQ-ACK transmission reliability. Since the value of N and M are known to both the transmitter (for example, a base unit) and the receiver (for example, a remote unit), the number of (N−M) bits are known to both sides. Two examples are shown in FIGS. 3 and 4.

According to an embodiment, after generating M HARQ-ACK feedback bits corresponding to M actually (re)transmitted CBGs, a remote unit concatenates the M HARQ-ACK feedback bits in ascending order of CBG index. Alternatively, the M HARQ-ACK feedback bits may be in descending order or in other orders. The (N−M) redundant bits are generated by repeating the values of M HARQ-ACK feedback bits till (N−M) redundant bits are fully padded. For instance, the (N−M) redundant bits carry (N−M) copies of the HARQ-ACK feedback bit when M=1. For another instance, the (N−M) redundant bits can carry a copy/copies and/or a portion of the M HARQ-ACK feedback bits. E.g., N=8, M=3, (N−M)=5, then the five redundant bits are generated by repeating the three HARQ-ACK feedback bits once and repeating two bits within the three HARQ-ACK feedback bits the second time.

Figure 3:
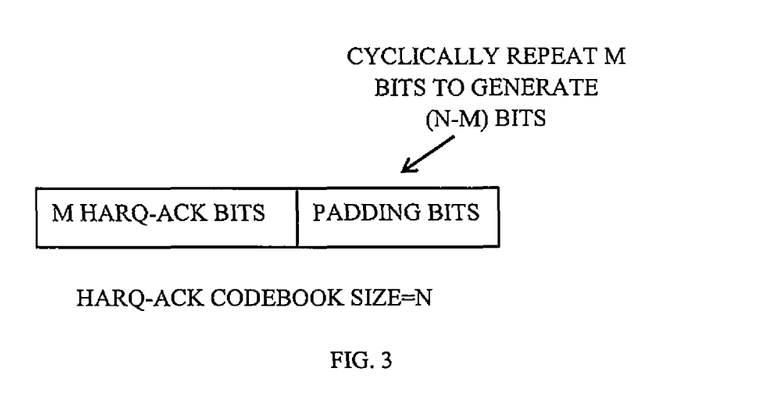
FIG. 3 illustrates an example of generating and padding redundant bits in HARQ-ACK codebook according to an embodiment of the present application.
Figure 4:
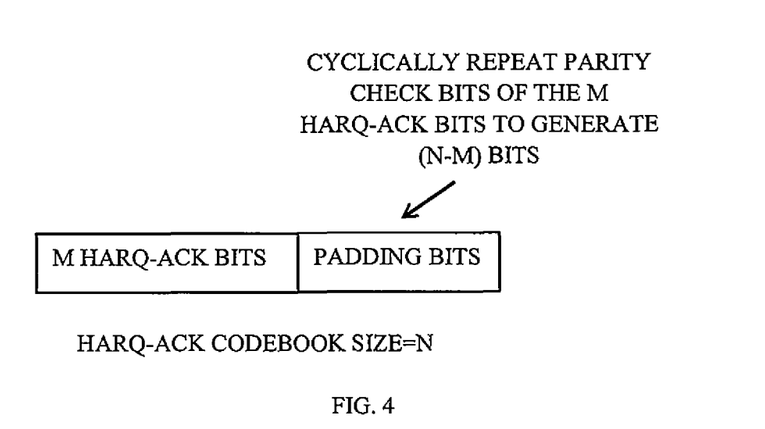
FIG. 4 illustrates an example of generating and padding redundant bits in HARQ-ACK codebook according to an embodiment of the present application.

In one example, the padded bits are appended in the M HARQ-ACK feedback bits as illustrated in FIG. 3. In another example, the padded bits are randomly arranged in the (N−M) redundant bits between the M HARQ-ACK bits.

According to an embodiment, the M HARQ-ACK feedback bits are encoded via (3, 2) coding and the redundant bits are used for transmission of encoded parity check bits. According to another embodiment, the M HARQ-ACK feedback kits are cyclic redundancy check (CRC) bits of the M HARQ-ACK feedback bits and the (N−M) redundant bits are used for transmission of the CRC bits. The following embodiments of fully using (N−M) redundant bits are under the parity check mechanism, but not limited to this check mechanism; for example, these embodiments are certainly applicable for the CRC check mechanism.

Particularly, in one embodiment, when M=1, then (N−M) redundant bits are generated by repeating the HARQ-ACK feedback bit (N−M) times; when M>1, the M HARQ-ACK feedback bits include $$\lfloor \frac{M}{2} \rfloor$$

bit pairs and (M mod 2) remaining bit (s). The $$\lfloor \frac{M}{2} \rfloor$$

bit pairs in the M HARQ-ACK feedback bits may be encoded to $$\lfloor \frac{M}{2} \rfloor$$

parity check bits, and one bit pair is encoded to one parity check bit.

In one embodiment, when $$N - M \geq \lfloor \frac{M}{2} \rfloor,$$

the (N−M) redundant bits are generated by cyclically repeating the encoded $$\lfloor \frac{M}{2} \rfloor$$

parity check bits. According the (N−M) redundant bits can carry a copy/copies and/or a portion of the encoded $$\lfloor \frac{M}{2} \rfloor$$

parity check bits. E.g., N=8, 5, (N−M)=3, then the five HARQ-ACK feedback bits include two bit pairs and one remaining t, and the three redundant bits are generated by repeating two encoded parity check bits of the two bit pairs one and repeating the first encoded parity check bit another time.

In another embodiment, when $$N - M < \lfloor \frac{M}{2} \rfloor,$$

the (N−M) redundant bits are a portion (e.g., the first (N−M) parity check bits) within the encoded parity check bits of $$\lfloor \frac{M}{2} \rfloor$$

bit pairs of the M HARQ-ACK feedback bits.

In one example, the encoded parity check bits of $$\lfloor \frac{M}{2} \rfloor$$

bit pairs of the HI HARQ-ACK feedback bits are appended in the M HARQ-ACK bits in the HARQ-ACK codebook, as illustrated in FIG. 4.

Figure 5:
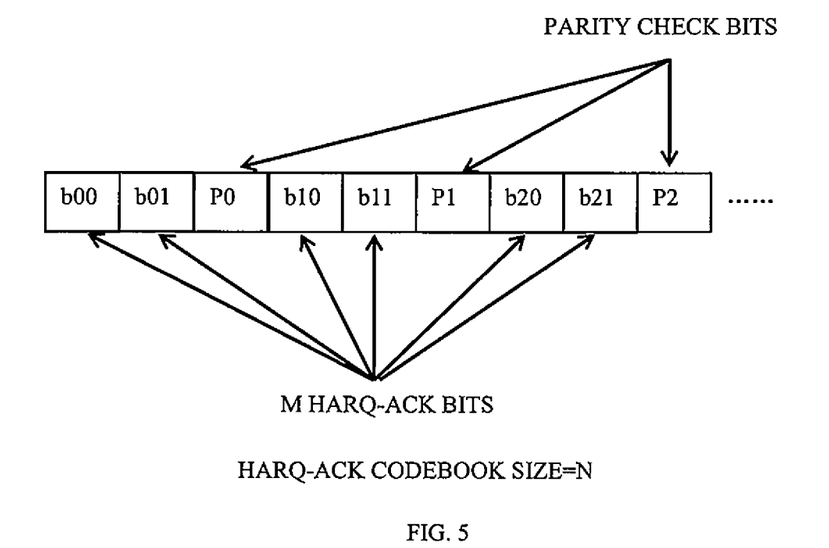
FIG. 5 illustrates an example of generating and padding redundant bits in HARQ-ACK codebook according to an embodiment of the present application.

In another example, the encoded parity check bits of $$\lfloor \frac{M}{2} \rfloor$$

bit pairs of the M HARQ-ACK feedback bits may be inserted between the $$\lfloor \frac{M}{2} \rfloor$$

bit pairs of the N HARQ-ACK feedback bits in the HARQ-ACK codebook. For a certain example, each encoded parity check bit may be inserted at the end of each corresponding bit pair within the $$\lfloor \frac{M}{2} \rfloor$$

bit pairs of the M HARQ-ACK feedback bits, as illustrated in FIG. 5. As shown in FIG. 5, P1 is a parity check bit of b00 and b01. In one embodiment, b00 and b01 can be encoded via (3, 2) coding. In the example of $$N - M < \lfloor \frac{M}{2} \rfloor,$$

each of a portion (e.g., the first (N−M) parity check bits) within $$\left\lfloor \frac{M}{2} \right\rfloor$$

parity check bits is inserted at the end of the corresponding first (N−M) bit pairs. In the example of $$N - M \geq \left\lfloor \frac{M}{2} \right\rfloor,$$

optionally, the $$\left(N - M - \left\lfloor \frac{M}{2} \right\rfloor\right)$$

redundant bits are appended at the end with NACK indication. In another option, the $$\left(N - M - \left\lfloor \frac{M}{2} \right\rfloor\right)$$

bits are appended at the end with cyclically repeated M. HARQ-ACK feedback bits.

In another example, HARQ-ACK feedback bits (M ACK/NACK bits) may be protected with CRC check. The (N−M) redundant bits are padded by the first (N−M) bits of the CRC parity check bits. For instance, the CRC with bit length to 8 may be used to encode the M ACK/NACK bits, the first (N−M) parity check bits are padded following the M ACK/NACK bits when (N−M)<8. In an example of (N−M)>==8, the (N−M) redundant bits are generated by cyclically repeating the 8-bit CRC bits. In another embodiment, one-bit odd-even parity check bit can be transmitted in one of the (N−M) redundant bits. For example, when there is even-number "1" in the M useful bits, the one-bit parity check bit is set "1"; otherwise, the one-bit parity check bit is set to "0" or vice versa.

According to an embodiment, a request signaling for adjustment of a modulation and coding scheme (NCS) can be transmitted in the (N−M) redundant bits in the HARQ-ACK codebook. This request signaling for adjustment of MCS can be generated by the remote unit based on the signal to interference plus noise ratio (SINR) experienced in the PDSCH (or PUSCH) transmissions that the remote unit has received corresponding to the current TB. Even when a remote unit cannot decode the CBs correctly, the remote unit can still estimate the received SINR using hard decoding. Suppose the SINR estimated by the remote unit corresponds to $MCS_R$ and the MCS received by the remote unit in the last PDSCH (or PUSCH) is $MCS_T$. Although the base unit determines the $MCS_T$ used in the transmission based on some estimation or feedback (such as channel quality indicator (CQI) in the Channel State information (CSI) feed back, or the AaK/NACK from the previous transmission), it is still possible for the received SINR to be lower than its expectation. For example, the used CQI is wide-band only, and the quality of the narrow band frequency selective channel is below the reported channel quality of the wide band channel.

In one embodiment, when the remote unit provides the CSI report based on the single-user-MIMO (SU-MIMO) assumption, and the transmitter uses a multiple-user-MIMO (MU-MIMO) pre-coder for MU transmission, or the remote unit simply suffers poor SINR from an extra-strong interference from neighboring cell (the flash-light effect), the base unit could also overestimate the received SINR due to the difference in the transmission pre-coder when a different transmitted precoding matrix indicator (TPMI) is used than the precoding matrix indicator (PMI) feedback. Because the $MCS_T$ is derived from the received transmissions it accurately reflects the quality of the received transmission and is useful for the base unit to determine the MCS used in the next transmission. The remote unit can signal the difference $\Delta MCS = MCS_T - MCS_R$ between the remote unit and the base unit using the available number of bits, e.g., the (N−M) redundant bits in the HARQ-ACK codebook.

The following Table 1 shows examples of values of difference $\Delta MCS = MCS_T - MCS_R$.

TABLE 1 examples of the difference $\Delta MCS = MCS_T - MCS_R$

| # of bits (N-M) | $\Delta MCS = MCS_T - MCS_R$ |
|---|---|
| 0 | N/A |
| 1 | 0: 0 |
|   | 1: -a1 |
| 2 | 00: 0 |
|   | 01: -a2 |
|   | 10 -b2 |
|   | 11: -c2 |
| 3 | Option 1: use 3 bits for ΔMCS encoding. |
|   | 000: 0 |
|   | 001: -a3 |
|   | 10: -b3 |
|   | 11: -c3 |
|   | 100: -d3 |
|   | 101: -e3 |
|   | 110: -f3 |
|   | 111: -g3 |
|   | Option 2: use only 2 bits ΔMCS encoding as (N-M) = 2 case. |
|   | 00: 0 |
|   | 01: -a2 |
|   | 10: -b2 |
|   | 11: -c2 |
|   | The remaining bit (s) in the (N-M) redundant bits may he reserved for other usage. |
| >3 | Similar to 3 bits case. |
|   | The remaining bit (s) in the (N-M) redundant bits maybe reserved for other usage. |

For example, the parameters {a1, a2, b2, . . . } are positive integers and these parameters can be defined in the spec, or configured by eNB or gNE through RRC signaling. An implementation is a1=a2=a3=1, b2=b3=2, c2=c3=3, d3=4, e3=5, f3=6, g3=7. Other values are possible. Because of the limited feedback states (2, 4 or 8), a remote unit may choose to use round or ceiling to match its ΔMS S to an encoded value for feedback. On receiving the ΔMCS, the base unit may adjust its MCS for the next (re) transmission to this UE.

Using the (N−M) redundant bits in the HARQ-ACK codebook for a remote unit to request real-time MCS adjustment gives a new way for the transmitter to get MCS information. In the traditional scheme, the base unit gets MCS (CQI) information from the feedback based on not real, but transmission with delays, with assumptions on the SU/MU-MIMO (usually it is SU-MIMO), on the PMI and on the interference. When MCS adjustment is sent to the base unit, the MCS adjustment provides the base unit with a realistic and accurate representation of the transmission quality. Factors that affect the received SINR, like the channel in the used physical resource blocks (PRBs), the TPMI and the real time interference are naturally factored in. This MCS feedback used in the (N−M) redundant bits in the HARQ-ACK codebook is also sent over a short interval of transmission and retransmission. It will improve the performance over more traditional feedback and link adaptation scheme based on the CSI feedback and the ACK/NACK feedback.

According to another embodiment, a channel quality indicator (CQI) feedback is carried by the (N−M) redundant bits in the HARQ-ACK codebook. The amount of CQI feedback is dependent on the number of the (N−M) redundant bits. For example, 4 bits are needed to indicate the CQI; when N−M>=4, the redundant bits are enough to indicate one specific CQI index; otherwise, a reduced CQI table is carried by the (N−M) redundant bits in the HARQ-ACK codebook.

In all the above embodiments, the redundant bits can be fully used to enhance the DL transmission performance and UL HARQ-ACK transmission reliability.

Figure 6:
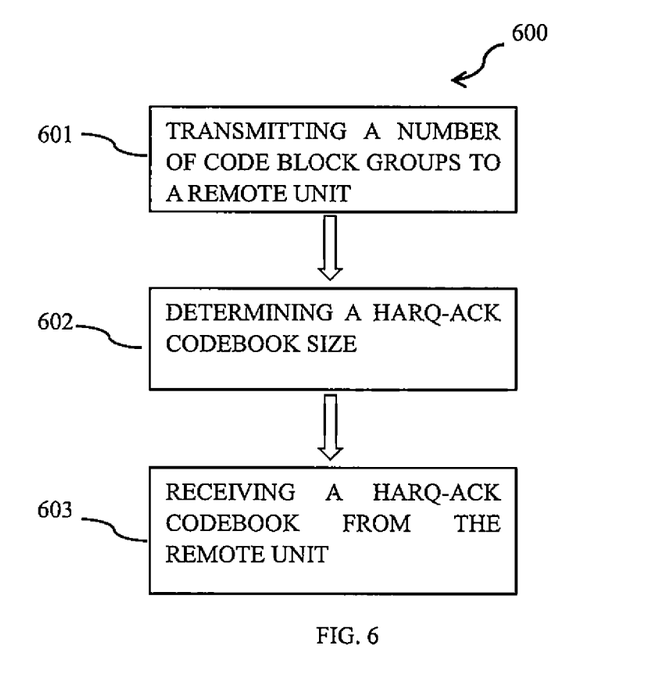
FIG. 6 illustrates an example flowchart demonstrating the operations of a base unit according to an embodiment of the present application.

FIG. 6 depicts a method 600 according to an embodiment of the present application. In some embodiments, the method 600 is performed by an apparatus, such as the base units 102. In certain embodiments, the method 600 may be performed by a processor executing program code, for example, a microcontroller, a microprocessor, a CPU, a GPU, an auxiliary processing unit, a FPGA, or the like.

In step 601, a number of CBGs is transmitted to a remote unit. In step 602, a HARQ-ACK codebook size is determined. For example, a HARQ-ACK codebook size corresponding to the number of transmitted CBGs is determined. In one embodiment, the HARQ-ACK codebook size is determined based on a preconfigured value. The preconfigured value may be indicated by a signal received from a base unit, indicated by a control signaling received before the data transmission, or indicated by a control signaling received during the data transmission. In step 603, a HARQ-ACK codebook having the determined HARQ-ACK codebook size is received from the remote unit. In one embodiment, a first portion of the HARQ-ACK codebook includes a number of HARQ-ACK bits with each bit corresponding to one CBG, and a second portion of the HARQ-ACK codebook includes a number of padded bits. The sum of the number of HARQ-ACK bits in the first portion and the number of padded bits in the second portion is equal to the determined HARQ-ACK codebook size. For example, the number of HARQ-ACK bits in the first portion, e.g., M, is equal to the number of CBGs actually received by a remote unit in initial transmission or retransmitted CBGs in retransmission between a base Unit and the remote unit. Assuming N is the RRC configured maximum number of CBGs of one TB, so (N−M) is the number of padded bits in the second portion of the HARQ-ACK codebook corresponding to the initial transmission or retransmission. All the above-mentioned implementations of fully using the (N−M) redundant bits in the HARQ-ACK codebook are applicable for this embodiment.

Figure 7:
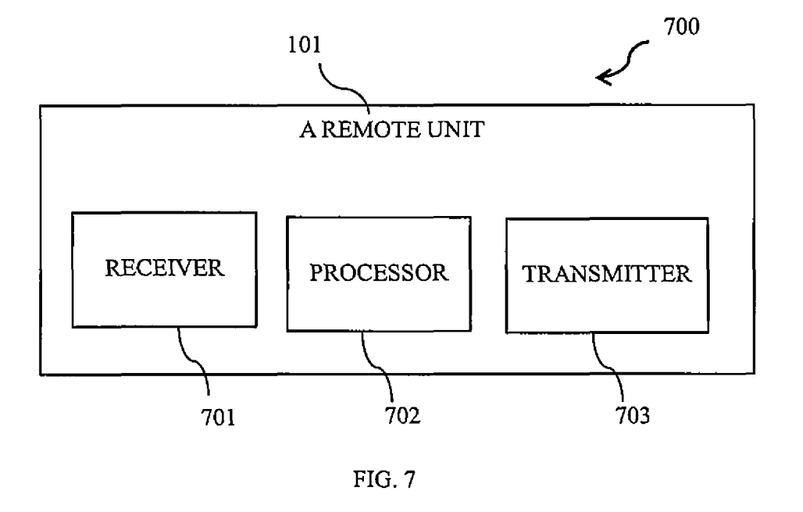
FIG. 7 is an example block diagram of a remote unit according to an embodiment of the present application.

FIG. 7 depicts an apparatus 700 according to the embodiments of the present application. The apparatus 700 includes one embodiment of the remote unit 101. Furthermore, the remote unit 101 may include a receiver 701, a processor 702, and a transmitter 703. In some embodiments, the receiver 701 and the transmitter 703 are combined into a single device, such as a transceiver. In certain embodiments, the remote unit 101 may further include an input device, a display, a memory, and/or other elements. In one embodiment, the receiver 701 receives a number of CBGs from a base unit 102, wherein each code block within a code block group is independently decodable. The processor 702 determines a HARQ-ACK codebook size corresponding to the number of code block groups. The transmitter 703 transmits a HARQ-ACK codebook to the base unit 102, wherein the HARQ-ACK codebook includes the first number of HARQ-ACK bits with each bit corresponding to one code block group and a second number of padded bits, wherein the first number plus the second number is equal to the determined HARQ-ACK codebook size. The functions and implementations of all elements in the apparatus 700 and definitions of related technical terms can refer to the specific descriptions of FIGS. 2-5 and the foregoing corresponding paragraphs in this specification.

Figure 8:
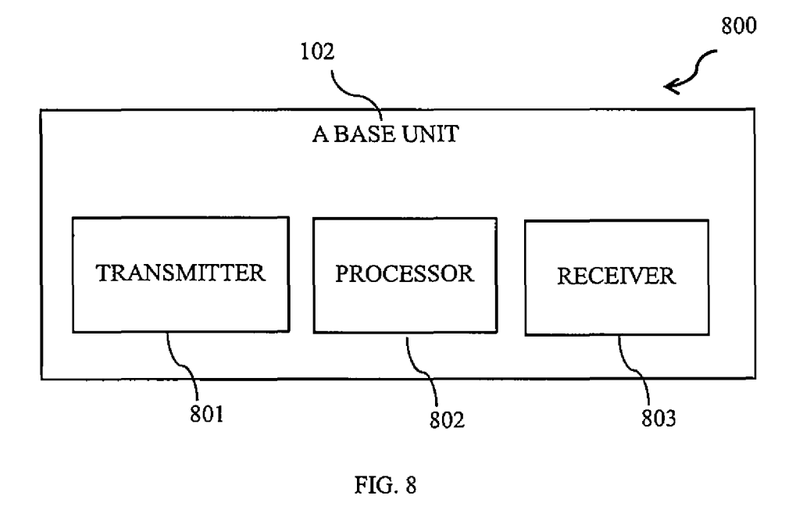
FIG. 8 is an example block diagram of a base unit according to an embodiment of the present application.

FIG. 8 depicts an apparatus 800 according to the embodiments of the present application. The apparatus 800 includes one embodiment of the base unit 102. Furthermore, the base unit 102 may include a transmitter 801, a processor 802, and a receiver 803. In some embodiments, the transmitter 801 and the receiver 803 are combined into a single device, such as a transceiver. In certain embodiments, the base unit 102 may further include an input device, a display, a memory, and/or other elements. In one embodiment, a transmitter 801 transmits a number of CBGs from to a remote unit, wherein each code block within a code block group is independently decodable. The processor 802 determines a HARQ-ACK codebook size corresponding to the number of code block groups. The receiver 803 receivers a HARQ-ACK codebook from the remote unit 101, wherein the HARQ-ACK codebook includes the first number of HARQ-ACK bits with each bit corresponding to one code block group and a second number of padded bits, wherein the first number plus the second number is equal to the determined HARQ-ACK codebook size. The functions and implementations of all elements in the apparatus 800 and definitions of related technical terms can refer to the specific descriptions of FIGS. 3-6 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present application by simply employing the elements of the independent claims. Accordingly, the embodiments of the present application as set forth herein are intended to be illustrative, not limiting. Various changes may be made without departing from the spirit and scope of the present application.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method comprising:
   receiving a first number of code block groups from a base unit, wherein each code block within a code block group is independently decodable;
   determining a hybrid automatic repeat request acknowledgement (HARQ-ACK) codebook size corresponding to the first number of code block groups;
   transmitting a HARQ-ACK codebook to the base unit, wherein the HARQ-ACK codebook comprises a first number of HARQ-ACK bits with each bit corresponding to one code block group and a second number of padded bits, wherein the first number plus the second number is equal to the determined HARQ-ACK codebook size.

2. The method of claim 1, further comprising receiving a signal from the base unit for indicating the HARQ-ACK codebook size.

3. The method of claim 1, wherein the second number of padded bits is a portion of the first number of HARQ-ACK bits.

4. The method of claim 1, wherein the second number of padded bits includes parity check bits of the first number of HARQ-ACK bits.

5. The method of claim 1, wherein the second number of padded bits includes a portion of cyclic redundancy check bits of the first number of HARQ-ACK bits.

6. The method of claim 1, wherein the second number of padded bits includes a request signaling for adjustment of a modulation and coding scheme.

7. The method of claim 1, wherein the second number of padded bits includes a channel quality indicator.

8. An apparatus comprising:
   a receiver that receives a first number of code block groups from a base unit, wherein each code block within a code block group is independently decodable;
   a processor that determines a hybrid automatic repeat request acknowledgement (HARQ-ACK) codebook size corresponding to the first number of code block groups;
   a transmitter that transmits a HARQ-ACK codebook to the base unit, wherein the HARQ-ACK codebook comprises a first number of HARQ-ACK bits with each bit corresponding to one code block group and a second number of padded bits, wherein the first number plus the second number is equal to the determined HARQ-ACK codebook size.

9. The apparatus of claim 8, wherein the second number of padded bits includes parity check bits of the first number of HARQ-ACK bits.

10. The apparatus of claim 8, wherein the second number of padded bits includes a request signaling for adjustment of a modulation and coding scheme.

11. A method comprising:
    transmitting a first number of code block groups to a remote unit, wherein each code block within a code block group is independently decodable;
    determining a hybrid automatic repeat request acknowledgement (HARQ-ACK) codebook size corresponding to the first number of code block groups;
    receiving a HARQ-ACK codebook from the remote unit, wherein the HARQ-ACK codebook comprises a first number of HARQ-ACK bits with each bit corresponding to one code block group and a second number of padded bits, wherein the first number plus the second number is equal to the determined HARQ-ACK codebook size.

12. The method of claim 11, further comprising transmitting a signal to the remote unit for indicating the HARQ-ACK codebook size.

13. The method of claim 11, wherein the second number of padded bits includes a portion of the first number of HARQ-ACK bits.

14. The method of claim 11, wherein the second number of padded bits includes parity check bits of the first number of HARQ-ACK bits.

15. The method of claim 11, wherein the second number of padded bits includes a portion of cyclic redundancy check bits of the first number of HARQ-ACK bits.

16. The method of claim 11, wherein the second number of padded bits includes a request signaling for adjustment of a modulation and coding scheme.

17. The method of claim 11, wherein the second number of padded bits includes a channel quality indicator.

18. An apparatus comprising:
    a transmitter that transmits a first number of code block groups to a remote unit, wherein each code block within a code block group is independently decodable;
    a processor that determines a hybrid automatic repeat request acknowledgement (HARQ-ACK) codebook size corresponding to the first number of code block groups;
    a receiver that receives a HARQ-ACK codebook from the remote unit, wherein the HARQ-ACK codebook comprises a first number of HARQ-ACK bits with each bit corresponding to one code block group and a second number of padded bits, wherein the first number plus the second number is equal to the determined HARQ-ACK codebook size.

19. The apparatus of claim 18, wherein the second number of padded bits includes parity check bits of the first number of HARQ-ACK bits.

20. The apparatus of claim 18, wherein the second number of padded bits includes a request signaling for adjustment of a modulation and coding scheme.

* * * * *